United States Patent [19]
Sen

[11] Patent Number: 5,535,989
[45] Date of Patent: Jul. 16, 1996

[54] LIQUID FILM PRODUCING PROCESS AND APPARATUS FOR FLUID-LIQUID CONTACTING

[76] Inventor: Dipak K. Sen, 721 Laurier Avenue, Milton, Ontario, Canada, L9T 4R1

[21] Appl. No.: 323,914

[22] Filed: Dec. 2, 1994

[51] Int. Cl.⁶ .................................................. B01F 3/04
[52] U.S. Cl. ................... 261/112.1; 261/114.1; 55/240
[58] Field of Search ................ 261/112.1, 114.1; 55/240

[56] References Cited

U.S. PATENT DOCUMENTS

| | | | |
|---|---|---|---|
| 671,375 | 4/1901 | Gallaher | 261/112.1 |
| 1,618,099 | 2/1927 | Lombard | 55/240 |
| 1,755,011 | 4/1930 | Ludlam . | |
| 2,054,809 | 9/1936 | Fleisher | 261/112.1 |
| 2,085,155 | 6/1937 | Heidbrink | 55/234 |
| 2,514,943 | 7/1950 | Ferris et al. | 261/112.1 |
| 2,587,416 | 2/1952 | Vedder | 55/240 |
| 2,747,849 | 5/1956 | Colburn et al. | 55/240 |
| 3,364,660 | 1/1968 | Rebours | 55/225 |
| 3,496,996 | 2/1970 | Osdor | 261/112.1 |
| 3,722,839 | 3/1973 | Erickson | 261/111 |
| 3,748,828 | 7/1973 | Lefebvre | 55/2 |
| 3,766,717 | 10/1973 | Belt | 55/223 |
| 3,782,703 | 1/1974 | Kolar | 261/112.1 |
| 3,795,388 | 3/1974 | Toth | 261/112.1 |
| 3,811,252 | 5/1974 | Evans et al. | 55/228 |
| 3,857,911 | 12/1974 | Szues et al. | 261/112 |
| 3,870,082 | 3/1975 | Holl | 138/40 |
| 3,898,922 | 8/1975 | Savage | 55/240 |
| 4,980,098 | 12/1990 | Connery | 55/240 |

FOREIGN PATENT DOCUMENTS

| | | | |
|---|---|---|---|
| 0183024 | 9/1985 | Japan | 55/240 |
| 0670317 | 6/1979 | U.S.S.R. | 55/240 |

Primary Examiner—Tim R. Miles
Attorney, Agent, or Firm—Young & Basile

[57] ABSTRACT

Processess and apparatus are provided to generate and use continuous and controlled liquid film for industrial and commercial applications requiring fluid-liquid contacts. In one version, a housing has a bottom and a tray mounted therein. The tray separates an upper section for holding liquid from a lower section for liquid-fluid interaction. Uniformly spaced, thin, straight film guides in close proximity extend downwardly from the tray towards the bottom. A narrow slit is formed in the tray along each line of film guides for enabling liquid in the upper section to flow to the lower section in the form of a flowing liquid curtain. The fluid can be a gas entering and exiting the housing through ports provided therein. In a preferred embodiment, a vertically extending tubular member is mounted centrally within several closed loops of film guides and extends through the tray. An adjustable sleeve is mounted on top of the tubular member and the tops of the film guides are secured to this sleeve. The invention may be used in a liquid-gas contacting column that comprises an upright vessel with a liquid inlet at the top and liquid outlet in a bottom portion. A series of trays are mounted one above the other in the vessel.

17 Claims, 7 Drawing Sheets

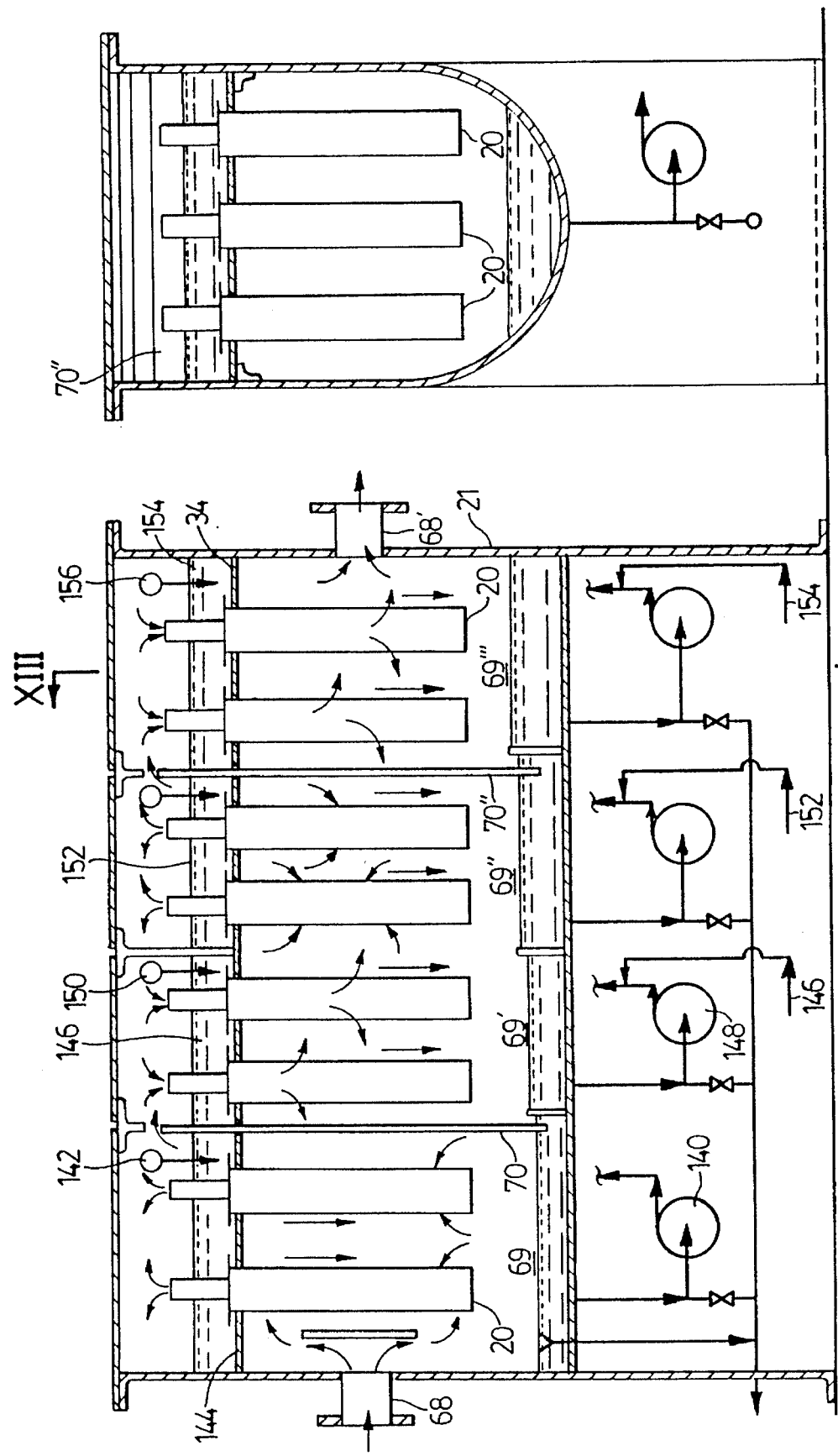

LIQUID FILM PRODUCING PROCESS AND APPARATUS FOR FLUID-LIQUID CONTACTING

FIELD OF THE INVENTION

This invention relates to direct fluid-liquid contacting methods and devices for industrial and commercial applications and to film forming methods and devices.

BACKGROUND OF THE INVENTION

There are many industrial and commercial applications wherein two or more fluids must be brought into contact with each other. For example, it may be desirable to absorb soluble pollutants such as $SO_2$, HCl etc. from air with water, which may or may not contain chemicals to remove the pollutants from the air supply. When removing soluble pollutants in this manner, the size and efficiency of the liquid-fluid contacting device is an important consideration in the design of such equipment.

There are a number of liquid-fluid contacting devices presently available. Spray dryers and scrubbers are widely used in chemical industries for drying and for pollution control applications. In these devices, liquid is dispensed by an atomizer as tiny droplets within a gaseous stream. To distribute liquid droplets over a wide cross-sectional area, a large liquid distribution piping network and a large number of atomizers are required. Moreover, a relatively large amount of energy is required to atomize the liquid. Further drawbacks with these systems include low transfer rates between soluble particles in the gas and liquid solvents and the possible lack of full contact between the gas and liquid as spraying is not uniform over the entire cross-section of an interaction chamber. The cost of such systems may be exceedingly high and efficiency low for many applications.

Packed columns contain solid internals such as Rashing rings, Berle saddles, Pall rings, stacked metallic sieves etc. wherein liquid falling over the packings is dispersed thereover to wet the surface thereof. The packings are designed to create a large liquid-dispersed surface area. Despite the many varieties of packings however, it is still difficult to provide an even distribution of liquid thereover. In addition, packed columns are not suitable for cleaning gas with high dust loadings as the dust accumulates within the packings. Moreover, high power consumption, channelling, flooding and loading are other operational drawbacks associated with packed columns.

Tray columns are widely used in industries, refineries and chemical plants. Tower internals are expensive. Use of downcomers within the tower for liquid flow from one tray to the other reduces gas flow area and increases tower diameter. Liquid gradient in the tray give rise to inefficient gas-liquid contacts. High pressure drop in the gas phase is another substantial drawback.

Wetted wall columns are characterized by small surface contact area compared to the overall volume of the equipment. Such columns are not suitable for large scale operations.

A number of devices employing threads, filaments etc. for distributing liquid for efficient liquid-fluid contact are known. U.S. Pat. No. 3,748,828 issued Jul. 31, 1973 to Akzo Belge S.A. discloses a process and apparatus wherein liquid is delivered to the end of a series of multi-filament threads arranged in at least one bundle so that liquid flows over each individual thread as a sheath therearound. A second fluid flows over the liquid sheaths to transfer heat or particles between the two fluids. This reference teaches that adjacent threads be sufficiently separated apart so that the individuality of every liquid sheath flowing along each thread is substantially retained.

U.S. Pat. No. 1,755,011, issued Apr. 15, 1930 to W. V. Ludlam discloses an air cleaner or filter device in which oil is fed into an upper chamber. The oil is allowed to seep down to a lower chamber containing a plurality of apparently randomly spaced vertical filaments consisting of hair or bristles, which are arranged around a central open passageway.

In U.S. Pat. No. 3,766,717 issued Oct. 23, 1973 to V. W. Belt, water is sprayed in the form of droplets to an incoming air flow. Numerous tubes are secured in a plate so that the tube bottom ends are just above the static water level below. The sprayed water accumulates over the plate and runs through both the inside and outside of the tubes like wetted wall columns.

In each of the above noted patent references, there is only limited surface contact between liquid and gas. Means for more intimate and repeated contact are desired for greater heat and/or material transfer efficiency.

SUMMARY OF THE INVENTION

An objective of the present invention is to provide a liquid-fluid contacting method and apparatus wherein a continuous liquid film or films with a large liquid surface area can be brought into intimate contact with fluids to provide enhanced material and heat transfer efficiencies compared to the prior art.

A further object of the invention is to enable the liquid surface area to assume a wide variety of well-defined geometrical shapes with controlled liquid flow thereby providing versatility for optimum design of liquid-fluid contacting equipment.

Towards these and other ends, there is provided a gas/liquid contacting apparatus comprising a housing compartmentalized by a tray mounted therein into an upper zone for holding a liquid and a lower zone for liquid-gas interaction, the tray having at least one narrow slit therein for enabling liquid contained in the upper zone to flow to the lower zone, and at least one line of substantially uniformly spaced, thin, straight film guides mounted in close proximity in the housing extending from the at least one slit in the tray and substantially into the interaction zone, thereby defining a grille for establishing a flowing film of liquid over a substantial area in the interaction zone, whereby a gas present therein can interact with the liquid of the film. The film guides are arranged in sufficient proximity so as to enable liquid to flow in panes between adjacent guides.

Preferably the guides are mounted to a bottom face of the housing and extend upwardly through the slits to a cross member mounted in the housing containing tensioning screws. The housing includes fluid inlet and outlet ports and a fan provides motive force for fluid flow.

The term "film guides" as used herein is a general term that includes such items as wires, threads, strings, filaments and thin rods, each of which has its own particular attributes. For actual and particular applications, these guides will be chosen on the basis of various considerations and requirements arising from the application.

In one embodiment, the apparatus includes a hollow elongate tubular member extending through the tray, having slots in the body thereof for flow of gas into or out of the tubular member and having a height above the tray sufficient to clear the depth of liquid in the upper zone. A plate is mounted to a bottom of the tubular member to which bottom ends of the film guides are secured. An annular sleeve is slidably mounted on an upper portion of the tubular member and has at least one outwardly extending flange for adjusting the tension of the film guides which pass through the at least one slit in the tray and are secured to the flange. Preferably, the apparatus includes a plurality of closed loops of film guides and the tray is divided into annular disks by concentric closed loop slits. The tray is held together by wire strips or by other methods connecting the tray portions. The closed loop of film may be constructed in any desired shape, e.g. circular, polygonal, starshaped, etc.

In a further variation of the invention, there is provided an apparatus capable of forming a liquid film, comprising an array of concentric, thin, circular film guides held in close proximity and substantially uniformly apart by supporting members arranged on a side of the film guides which form a flat screen. A motor rotates the screen about a central axis thereof. A source of liquid is positioned adjacent to the array of film guides and capable of dispensing liquid onto said screen so as to form a liquid film thereon when said screen is rotated by or through said source, said liquid film extending between the film guides.

Continuous and controlled liquid film created in accordance with the invention can be effectively used in a wide variety of industrial and commercial applications specially for those involving fluid-liquid contacts. Examples of these applications are industrial air pollution control, indoor air pollution control, incinerator air pollution control, fractional distillation, rectification, absorption desorption, drying, heating and cooling of fluids, humidification, evaporation and dehydration, combustion of oil, chemical reactions, separation of immiscible liquids, shielding and protection against heat or corrosive gases and for decorative water fountains.

The liquid film formed with this invention acts like a permeable membrane for cross flow operations of the gaseous fluid. Each and every gas particle must pass through this membrane. Thus, the invention provides assured contact of the gas molecules with the liquid. In addition, the thin nature and close arrangements of the membranes allow repeated contacts of the gas molecules with the liquid. Partitioning of the liquid within a film module to wash the gas molecules can increase the efficiency of absorption or desorption of gases even under equilibrium conditions.

BRIEF DESCRIPTION OF THE DRAWINGS

The invention may be better understood by way of non-limiting example by the following detailed description of preferred embodiments and by reference to the drawings; wherein:

FIG. 12 is a cross-sectional elevation of an apparatus for indoor air pollution control constructed from a plurality of the fluid-liquid contacting devices shown in FIGS. 3 and 4;

FIG. 13 is a cross-sectional elevation taken along the line XIII—XIII of FIG. 12.

DETAILED DESCRIPTION OF PREFERRED EMBODIMENTS

Figure 1:
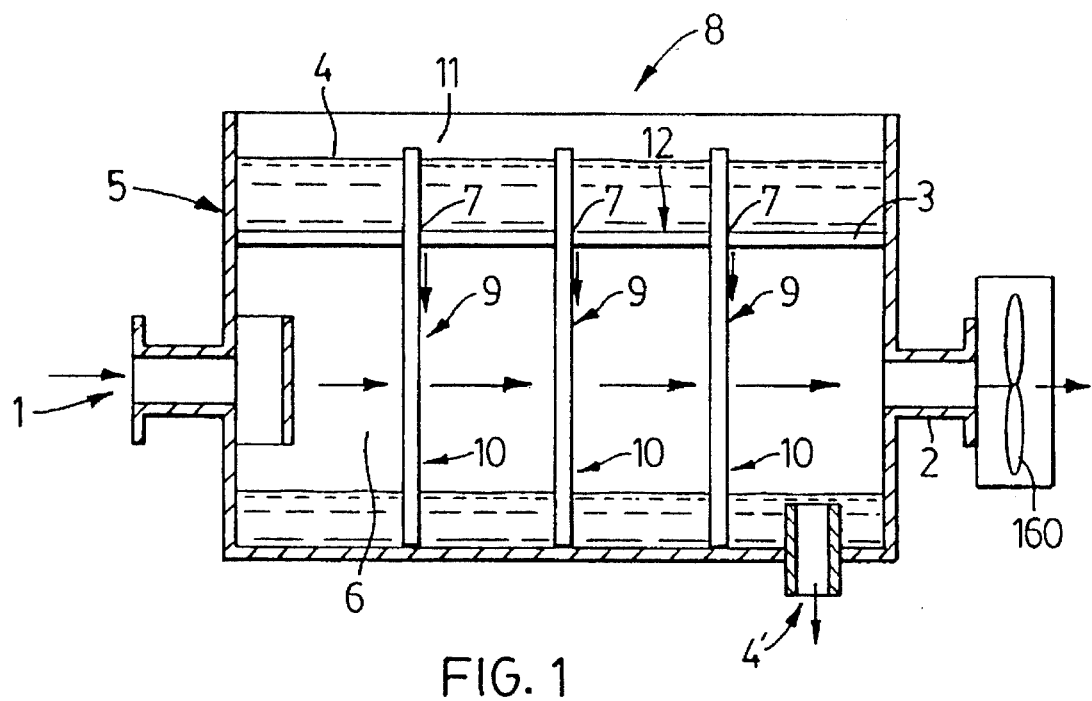
FIG. 1 is an elevational view of a simplified fluid-liquid contacting device in accordance with a first embodiment of the invention taken along the line I—I of FIG. 2.
Figure 2:
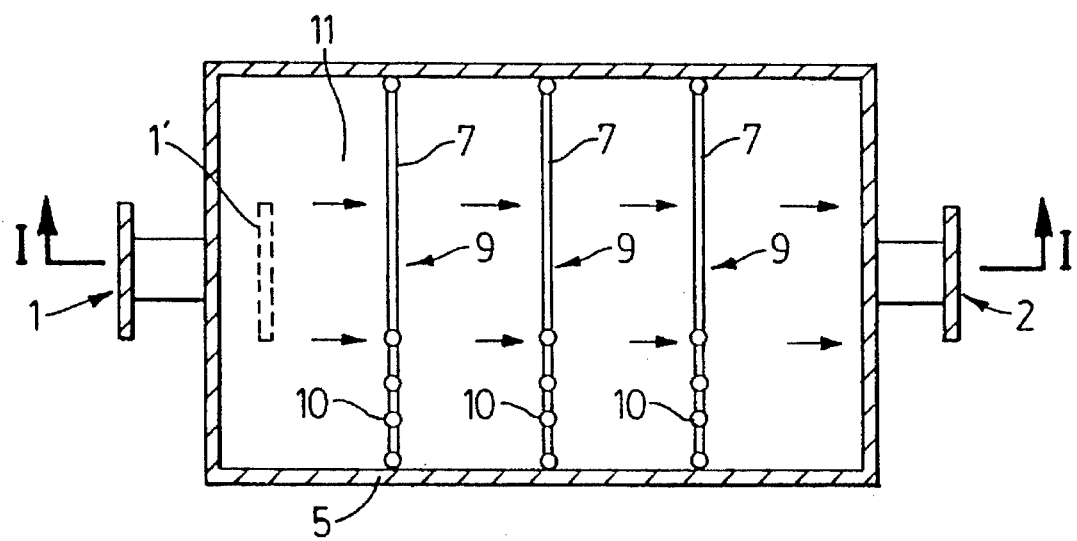
FIG. 2 is a plan view of the fluid-liquid contacting device shown in FIG. 1.

Referring to the drawings, FIGS. 1 and 2 show a first simplified embodiment of the invention in elevational and plan view respectively. A liquid-fluid contacting apparatus 8 comprises a housing 5 in which is mounted a horizontal liquid holding tray 3 spanning the interior thereof, thereby defining a top liquid chamber or zone 11 for holding liquid and a bottom fluid-liquid interaction chamber or zone 6. The liquid chamber 11 includes a liquid inlet 4 and the interaction chamber 6 includes a liquid outlet 4'.

The housing 5 includes an array of rod-like film guides 10 arranged in straight parallel lines across the housing. (A "line" as hereinafter generically referred to may be a straight or curved line, segmented or not, and may include a closed path such as a circle or any other closed loop such as an n-sided polygon.) The guides 10 extend downwardly from the liquid chamber 11 through slits 7 in the tray 3 and generally normal thereto, through the interaction chamber 6, and to the bottom of the housing 5. The film guides 10 are firmly held, substantially uniformly spaced and in close proximity to each other to form a fine grille. Liquid flows from the liquid chamber 11 through the slits 7 and along the film guides 10 such as to form panes of liquid between adjacent guides 10. In aggregate, the liquid moving downwardly through the inter-spaces between adjacent guides 10 and the liquid covering the guides gives the appearance of a moving liquid film 9 (or curtain) extending from the bottom of the tray 3 to the top surface of liquid in the interaction chamber 6. The liquid is removed through the liquid outlet 4'.

Preferably, each line of guides 10 is transversely spaced across the interaction chamber 6 so as to span a substantial cross-section thereof. The liquid films 9 are situated between a gas inlet 1 in the housing 5 and a gas outlet 2 therein. Preferably the inlet 1 contains a baffle 1' for more evenly distributing gases flowing into the interaction chamber 6. The motive force for the gas flow is preferably a suitable fan upstream or downstream of the housing 5. FIG. 1 illustrates the use of a fan 160 located at the outlet 2, where the fan is used to pull the gas through the housing. A pump (not shown) may also be employed to circulate liquid from the interaction chamber 6 back to the liquid chamber 11.

The film guides 10 may be made of, for example, metallic or nylon strings or other synthetic or natural fibers and are preferably suitably tensioned. Such tensioning may occur for example by bonding said guides 10 to the tray 3 at slits 7, or by introducing a cross member (not shown) situated atop the housing 5 parallel to the line of guides 10 and provided with tensioning screws (not shown) onto which are wrapped the string guides, in a system much like the tensioning system of guitar strings. Other suitable known alternatives may be employed for providing sufficient tension to the guides 10. The liquid has a tendency to pull the strings together because of surface tension properties. Hence, it is important to provide appropriate tensioning and/or support and maintain appropriate clearance between the strings.

The film guides can be made of most commonly known materials including, but not limited to, metals, ceramic, synthetic, graphite, cellulose fibers. Synthetic fibers include those produced from polyamides, polyesters, polyvinyl, polyolefins, polypropylene and polyethylene, polytetrafluoroethylene etc. Cellulose materials include cotton, cellulose acetate and acetate esters etc. Metal wires include steel, stainless steel, galvanized steel, nickel, gold, silver, platinum, titanium, aluminum, copper, etc. and various alloys. The string materials should be inert to the fluids encountered and should be chosen for their mechanical, physical and chemical characteristics. Surface treatments, such as creating irregularities on the surface of wires, strings, etc. to develop or enhance wetting characteristics of the materials can be used to obtain the desired results. In addition, wetting agents may also be used to initiate wetting of the strings and once such bonding occurs, the film will continue to adhere to the strings.

To exemplify the dimensions for this embodiment of the invention, the guides 10 may have a diameter of 0.5 mm or less and are spaced apart at a pitch of 3 mm measured center to center. The slit width on the tray 12 is 0.5 mm and the slits 7 may or may not be covered by a sponge or other fibrous materials to impede the flow of liquid therethrough depending on the specific application. In such an embodiment, the thickness of the liquid film 9 may be 0.5 mm or less. Depending on the nature of the liquid-gas interaction desired, for a given gas flow, the liquid flow, the dimensions of the equipment, the number of liquid films, and other design details can be determined by a person with appropriate skill in the art.

It will thus be seen from the description above that a very thin liquid film is produced, irrespective of any large scale supporting surfaces such as a sheet or board. The gas therefore flows through the liquid film whereupon it is subject to intimate contact therewith. It should be appreciated that because of the very thin nature of the liquid, substantially no bubbling of the gas occurs in its journey through the liquid film. Additionally, the thin film does not cause a large gaseous pressure drop across the film, thereby avoiding the need to expend a great deal of energy to provide motive gas force and substantially avoiding the problem of disrupting the contour of the liquid film. A further advantage with the invention lies in the fact that the film spans preferably the entire cross section of the interaction chamber 6. Therefore there is a very high assurance that all the gas will be subject to interaction with the liquid.

Figure 3:
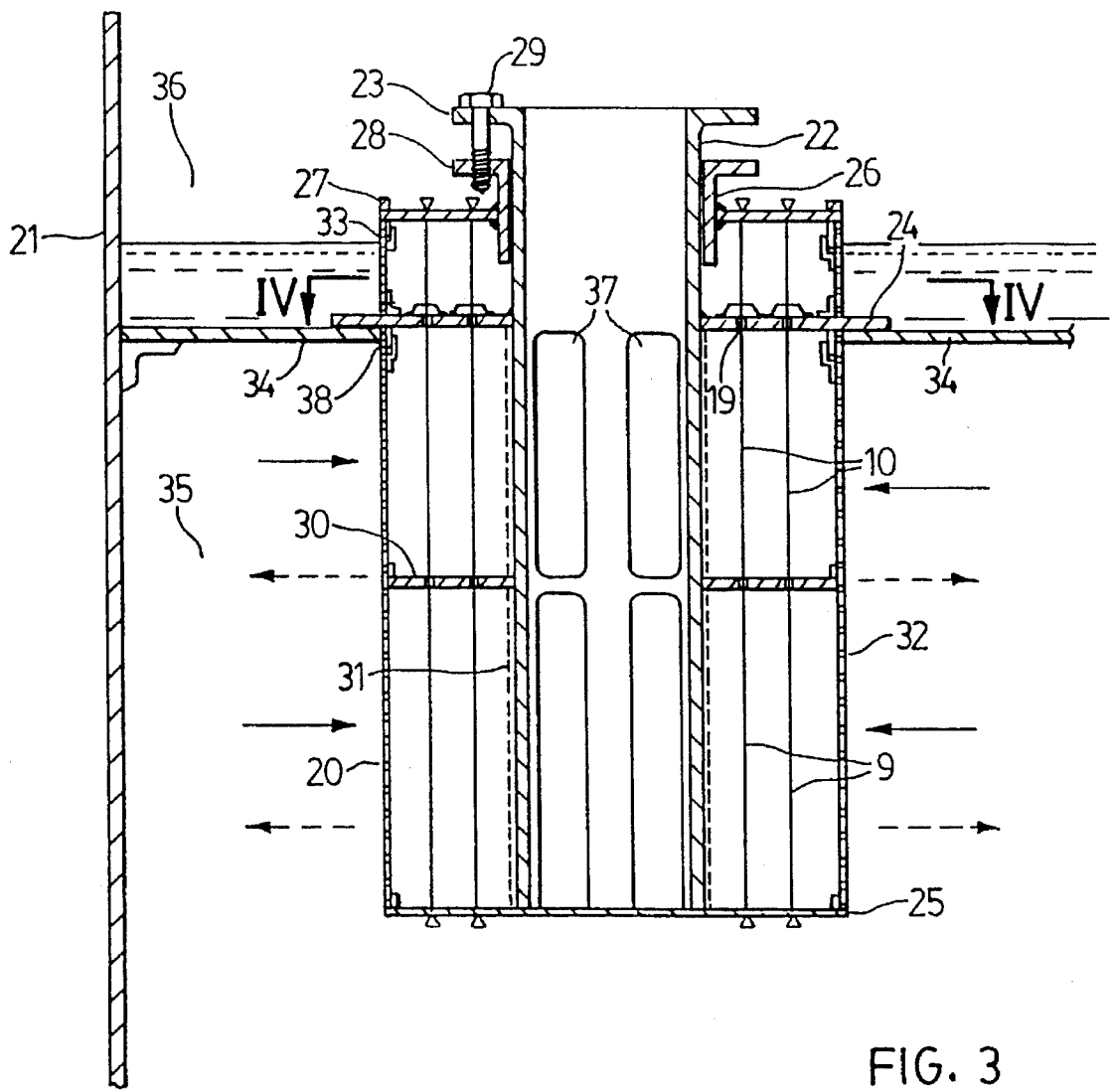
FIG. 3 is an elevational cross-section of a preferred embodiment of fluid-liquid contacting device constructed in accordance with the invention.
Figure 4:
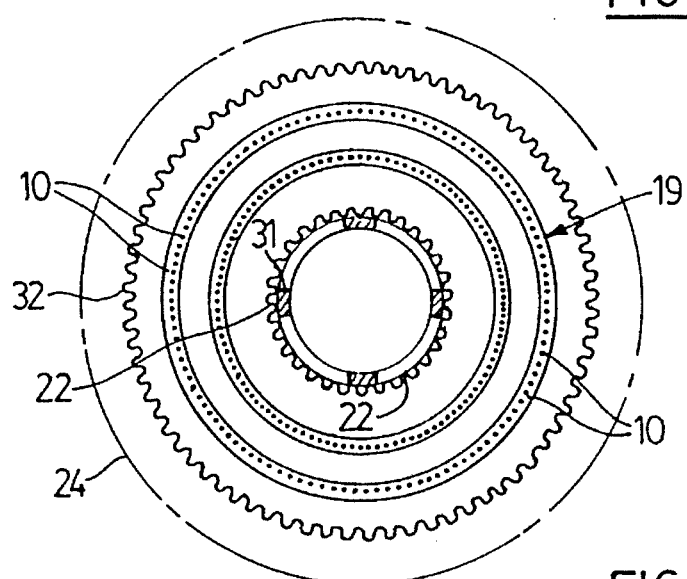
FIG. 4 is a plan view of a fluid-liquid contacting device in accordance with a second embodiment of the invention, this view being taken along the line IV—IV of FIG. 3.

FIGS. 3 and 4 show a second embodiment of the invention wherein a module 20 is fitted in a vessel 21, only part of which is shown. As will be discussed below, a number of such modules 20 can be fitted in the vessel 21 to provide a column for industrial and commercial uses.

The module 20 comprises a substantially hollow central tubular member 22 including an abutting, slotted, upper annular flange member 24 which forms part of a tray 34, as discussed in greater detail below. The tray compartmentalizes the module 20 into an upper liquid holding zone and lower fluid-liquid interaction zone 35. A short sleeve 26 with a top annular flange member 28 at its upper end is slidably mounted on the upper end portion of the tubular member 22. The sleeve 26 also includes a larger annular flange member 27 onto which are secured film guides 10 that extend through slits 19 to in flange 24 to a horizontal plate member 25 mounted to the bottom end of the tubular member 22. The top end of the tubular member 22 includes radially extending end flange 23 having apertures aligned with threaded apertures present on flange member 28 so as to facilitate tensioning of the sliding member 26, and hence film guides 10, with bolts 29 (only one being shown).

The tubular member 22 includes vertical slots 37 within the liquid-fluid interaction zone 35 between flange 24 and plate 25 for passage of fluid therethrough. If desired, the tubular member 22 may be provided with an intermediate flange member 30 to provide further support for the film guides 10.

In this embodiment, arrays of film guides 10 are arranged in closed loop lines, thereby forming a series of concentric annular liquid films, in the manner described above. A number of such annular films can be accommodated within a film module 20, although for illustrative purposes only two films are shown. Preferably, an upper protective screen 33 protects the upper end portions of the outer film guides 10 and a lower protective screen 32 protects the rest of these outer film guides and the outermost annular film, and the innermost film is protected by an inner film screen 31. The screens 31 and 32 also aid in preventing carry over of liquids with gases and protect the film guides during handling of the module.

Flange member 24, as mentioned, is slotted to allow film guides 10 and the liquid therethrough. Such slots 19 are annular in order to match the shape of the annular films, and thus the flange 24 is partitioned into annular, i.e. toroidal, disks. Wire strips or segments 39 keep the annular disks of flange 24 in place and leave the liquid flow unobstructed.

The module 20 can be installed in a vessel 21 in a manner shown in FIG. 3. Vessel 21 includes a series of vertically spaced horizontal partitions, i.e. trays 34 for accepting a plurality of modules 20. The trays 34 have cutouts 38 with a diameter slightly larger than the diameter of the protective screen 32 and the bottom disk 25 and smaller than the flange 24. Thus the flange 24 sits on the tray 34 with a suitable gasket (not shown) between it and the tray. The flange 24 may also be bonded to the tray 34.

The film modules can be made light weight in construction and can contain only a small amount of liquid hold-up. The module can be easily constructed with synthetic or thin metallic or other light weight materials and the overall equipment, where the film modules are to be installed, can also be made of plastics, FRP and other light weight materials for many applications. Such equipment can be easily housed or even can be mounted on roofs, if permitted. Thus, the equipment will be suitable for indoor air pollution control for offices and buildings or for other light weight applications.

In use, the zone below each horizontal tray 34 is the fluid-liquid interaction zone 35. Gas or other fluid passes from the interaction chamber 35 through the protective screen 32 and through the annular series of films 9 formed by the film guides 10. The gas flow continues through the inner protective screen 31 and through the slot spaces 37 into the interior of the tubular member 22 and then upwardly through the tubular member 22 into a gaseous zone 36 above the tray 34.

Liquid is supplied to the tray 34 which also acts as holding tray therefor. From the holding tray 34 the liquid passes through the slots 19 in the flange member 24 and flows downwardly in panes between the film guides 10 to form the moving liquid film as described above. The liquid then collects at the bottom of the module 20 at the lower disk member 25 and flows over the edge thereof into a next tray immediately below (not shown).

The described gas flow arrangement can be reversed, i.e. the gas may enter the gas space 36 and into the tubular member 22 and pass downwardly through the tubular member 22 into the slots 37. The gas then passes through the annular liquid films 9 and into the interaction chamber 35 through the outer protective screen 32.

As an example of one application, a sole film module 20 can be used in an appropriately designed enclosure and the equipment mounted on an exhaust pipe for control of dusts and soluble chemicals from vent gases.

As would be apparent to persons skilled in the art, it is possible to design many shapes and forms for such film modules utilizing a variety of methods for tensioning the film 10 guides and maintaining appropriate clearances therebetween.

Figure 5:
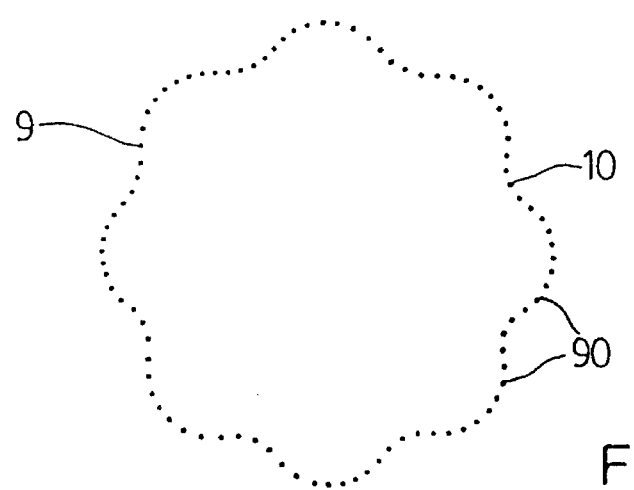
FIG. 5 is a plan view illustration of a liquid film contour producible with a variation of the device depicted in FIGS. 3 and 4.
Figure 6:
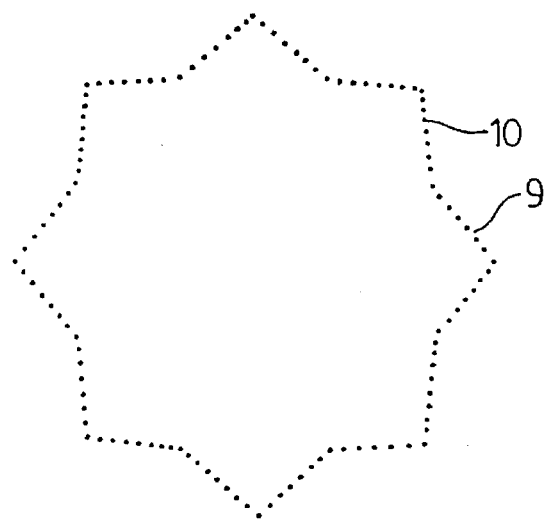
FIG. 6 is a plan view illustration of a liquid film contour producible with a variation of the device depicted in FIGS. 3 and 4.
Figure 7:
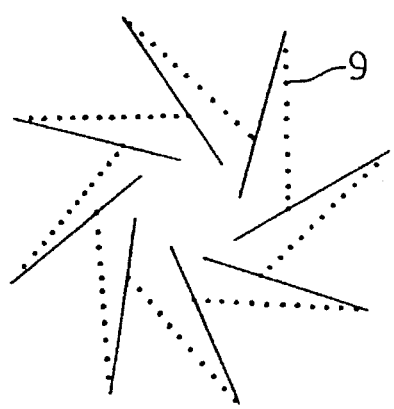
FIG. 7 is a plan view illustration of a liquid film contour producible with another variation of the device depicted in FIGS. 3 and 4.

FIGS. 5, 6 and 7 show variations of liquid film contours that could be made with the film module 20. Such variations may be considered in order to increase the surface area of films within the module, or to provide impingement facilities for solid objects passing through at high speed, or from other considerations. Similarly, the contour of the films are not limited those shown. A person skilled in the art can readily design and construct as many varieties of contours as required. FIG. 5 illustrates a generally circular film with uniform ripples or corrugations 90. FIG. 6 illustrates an eight-point star arrangement for the film 9 while FIG. 7 illustrates a possible pin wheel arrangement.

Figure 8:
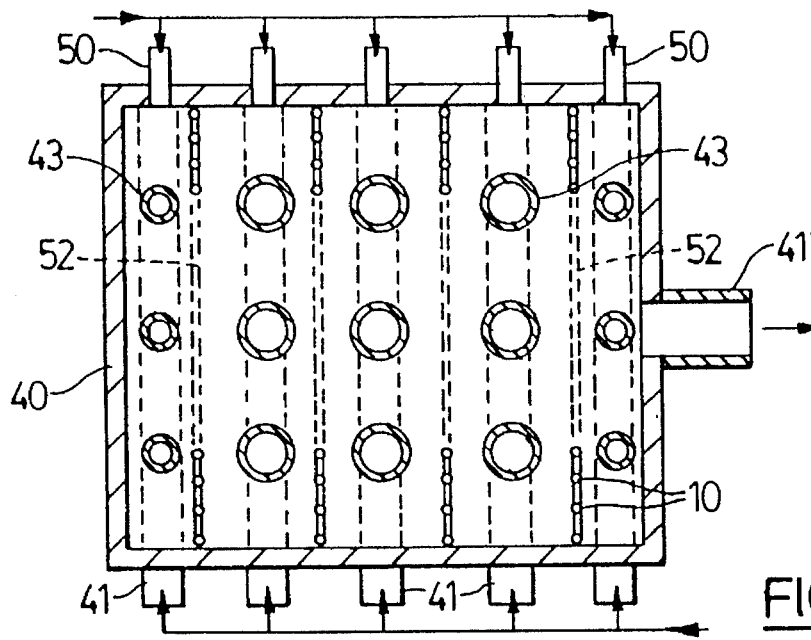
FIG. 8 is a plan view a fluid-liquid contacting device in accordance with a third embodiment of the invention wherein gas flows parallel to liquid films produced by the device.
Figure 9:
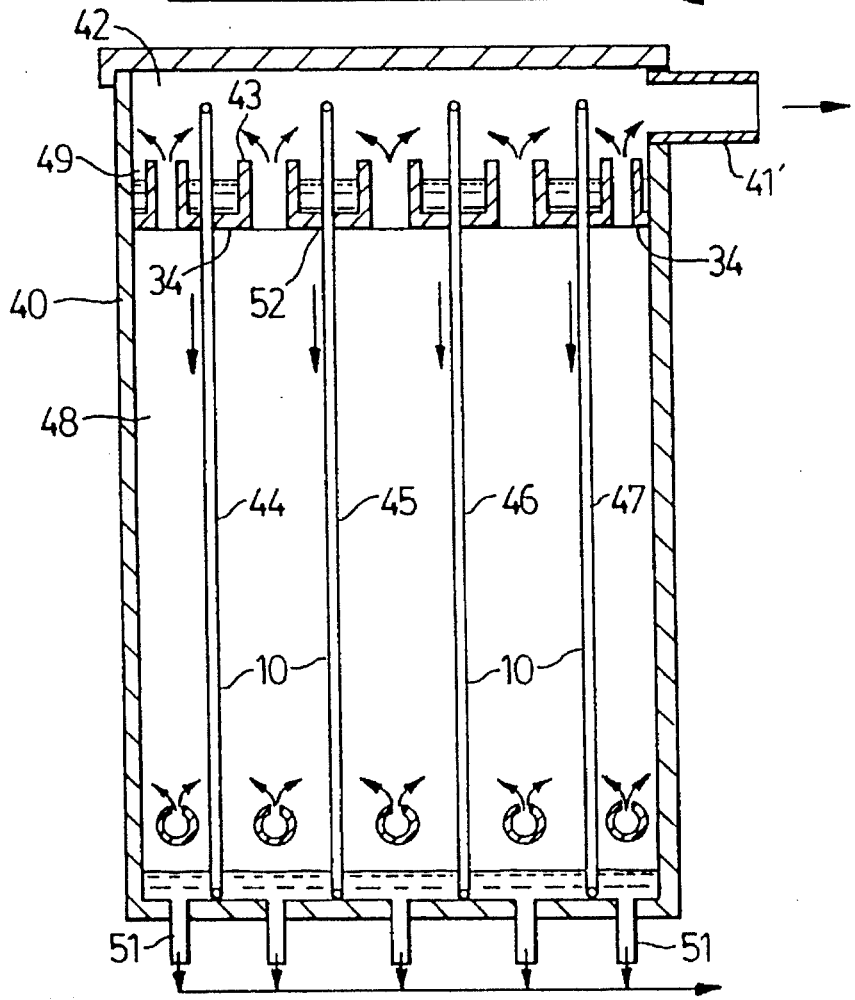
FIG. 9 is an elevational view of the device in FIG. 8.

FIGS. 8 and 9 show in plan and elevational views respectively a further embodiment of the invention, where co-current or counter-current gas flow pattern is desired for heat and material transfer. Instead of gas passing through the liquid film(s) in a cross-current manner as described in previous embodiments, the gas can pass along the surface of the liquid film(s) in a co-current or counter-current manner.

The embodiment shown by FIGS. 8 and 9 comprises a housing 40 with a liquid tray 34 and four series 44, 45, 46 and 47 of transversely oriented film guides 10. The number of liquid films generated may be varied as desired. The housing 40 includes inlets 41 which allow fluid or gas into the lower part of the housing 40 on each side of the film guides 44, 45, 46 and 47. The liquid tray 34 has a series of chimneys 43 through which the gas passes from a liquid-fluid interaction chamber 48 to a gas space 42 in liquid chamber 49. The gas leaves the gas space 42 through a gas outlet 41'. The housing includes liquid inlets 50, which feed liquid into the liquid chamber 49, and liquid outlets 51 which remove liquid from the bottom of the housing 40.

In use, the liquid flows downwardly from the liquid chamber 49 through slits 52 in the liquid tray 34 and between the film guides and is removed from the bottom of the housing 40 through the liquid outlets 51. The liquid falling between adjacent film guides and clinging to the guides creates a falling liquid curtain for the entire transverse section of the housing, as described above. The gases passing upwardly in a counter-current manner interact with the liquid on both sides of each liquid film within the interaction chamber and finally pass through the gas outlet 41' after passing through the chimneys 43 and gas space 42.

The arrangement is particularly suitable for concentrating a relatively viscous solution. Hot gas is supplied through the inlets 41 comprising gas spargers. The liquid films are heated on both sides of the film whereupon vapours from the liquid are carried out of the interaction chamber with the gas stream. By having the films 44, 45, 46 and 47 in close proximity, the diffusional resistances within the gas phase can be reduced and a more even distribution of temperature in the gas phase can be achieved. Similarly, the diffusional resistances for migration of dissolved gaseous materials to the film surface are significantly reduced because of the thin nature of the film and the reduction of migrating distances. These factors contribute to increased heat and mass-transfer rates and result in compact equipment design and product improvements.

The apparatus shown in FIGS. 8 and 9 may be modified to function as a module, a plurality of which can be assembled in a larger vessel in a similar manner to the use of the modules shown in FIGS. 3 and 4. In view of the thin nature of the films, a large number of films can be accommodated within a module with a very close spacing therebetween. As a result, a very compact and efficient apparatus can be designed.

Figure 10:
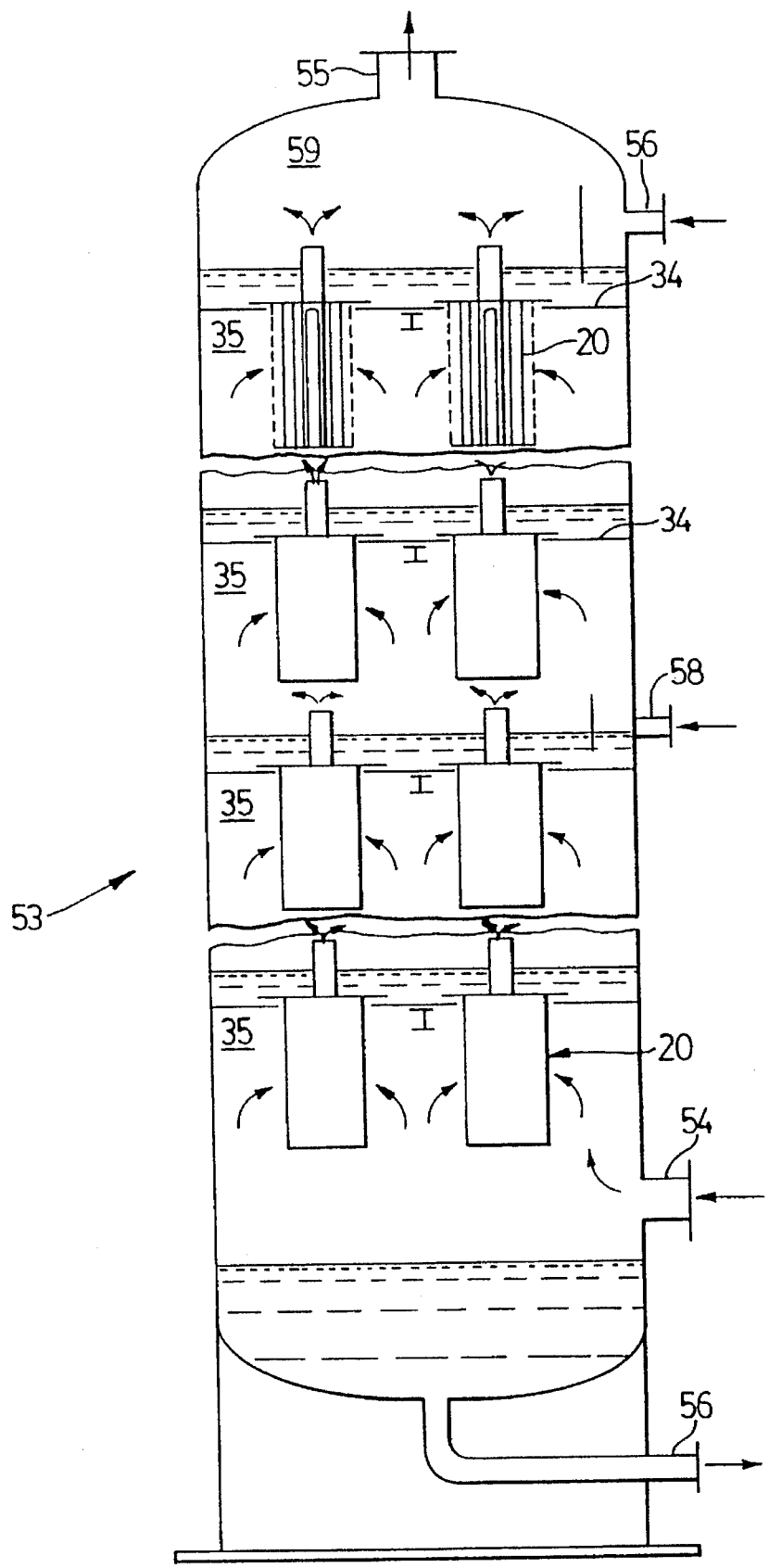
FIG. 10 is a schematic sectional illustration of a distillation column constructed from a plurality of the fluid-liquid contacting devices shown in FIGS. 3 and 4.

FIG. 10 is a schematic illustration of a typical distillation column 53 including a vapour inlet 54, a vapour outlet 55, a reflux inlet 56 and a bottom outlet 57 for the liquid. A feed inlet 58 for the column 53 is at an intermediate tray between the reflux inlet 56 and the vapour inlet 54. Film modules 20 are mounted on trays 34 as previously described. The vapour interacts with the liquid films within fluid-liquid interaction zones 35 and finally leaves through the vapour outlet 55 from a vapour space 59. It is apparent that there are no downcomers and no liquid gradient on the trays in this design, which at the same time offers the advantages of intermediate liquid or vapour withdrawals in a manner similar to conventional tray towers. Further advantages of this embodiment of the invention include large surface area of the liquid films, better vapour-liquid contacts, and partitioning of the liquid through multiple films within a single film module to increase tray efficiencies as compared to conventional tray and packed towers. This arrangement with appropriate modifications is also suitable for absorption of chemicals from the gases with a liquid and desorption of chemicals from a liquid with a gas.

Figure 11:
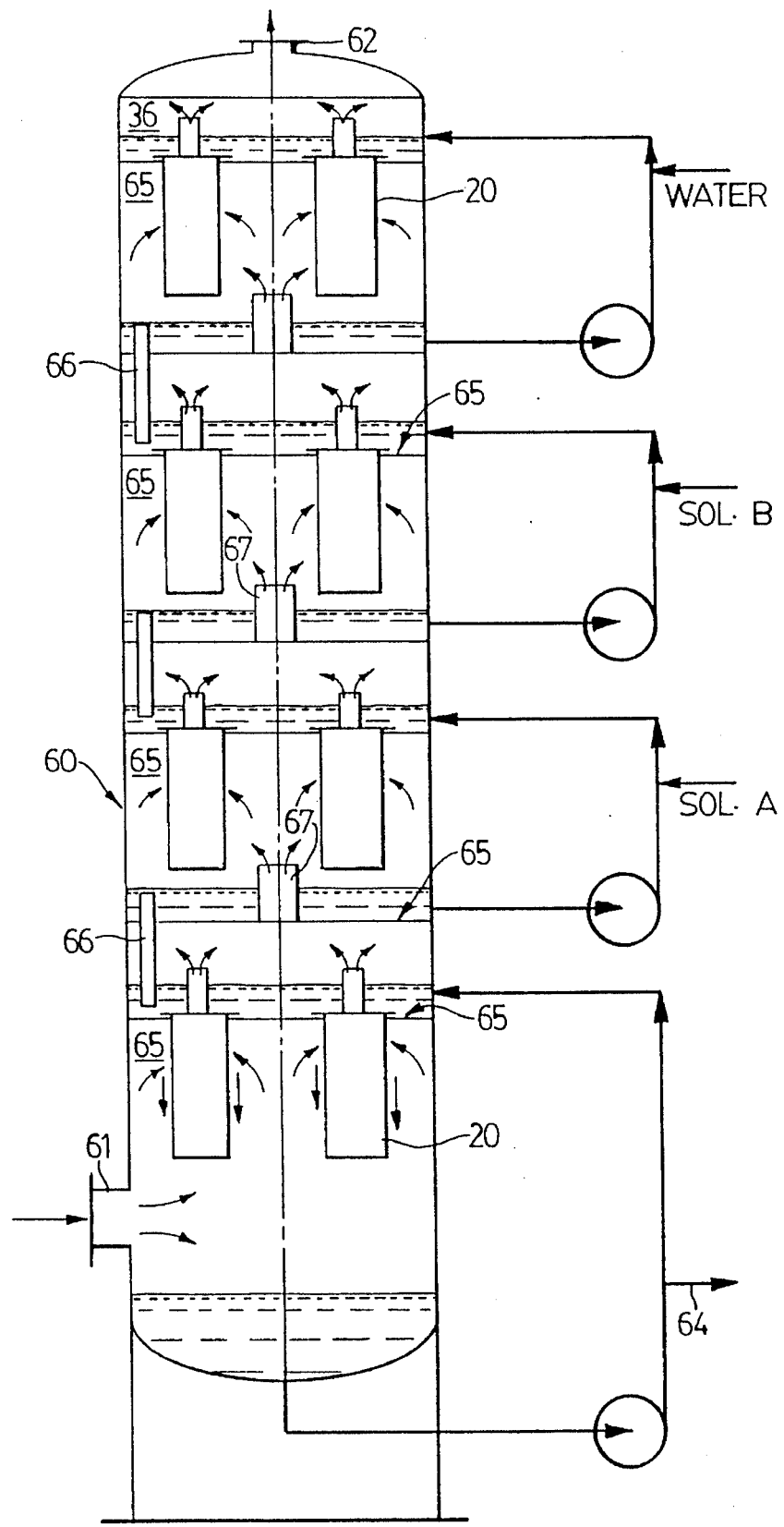
FIG. 11 is a schematic illustration of a scrubber tower for air pollution control constructed from a plurality of the fluid-liquid contacting devices shown in FIGS. 3 and 4.

FIG. 11 is a schematic illustration of a typical embodiment of the invention employed as a tower 60 for industrial air pollution control. In a typical coal or oil fired power plant application, hot gases are brought in by a pipe 61 and clean air leaves through a pipe 62. The motive force for the hot gases is generally provided by fans upstream or downstream of the tower 60. The liquid falls by gravity from tray to tray. The hot gases are contacted with recirculated water at the bottom interaction zone through the film modules 20 constructed in the manner shown in FIGS. 3 and 4. The films for the bottom tray film modules can be made relatively thicker to allow quenching of the hot gases. Dusts of all sizes will be captured by the liquid films and carried away through waste water at 64.

More than one tray (only one tray is shown in FIG. 11) can be used at the bottom of the tower described above for this purpose to obtain desired results. It is apparent from FIG. 11 that the polluting gases can be easily contacted with more than one type of liquid or chemical solution with the necessary number of film modules to achieve selective removal of components from the gas by contacting it with selective liquids. The liquid collection arrangement, such as a tray 65, a liquid distribution pipe 66 and a gas distribution pipe 67 make such designs convenient and practical.

It is also apparent that with the repeated fluid-liquid contacts made possible through this embodiment, the air can be made free of particulate of all sizes including sub-micron particles, acid gases and many other pollutants practically to any desired level and within a single vessel suitably designed for most applications.

It should be noted that the dusts are captured by the films through inertial impaction, diffusion, and electrostatic attraction as the case may be, irrespective of the characteristics and sizes of the dusts as well as dust loadings. Conventional equipment such as bag filters or electrostatic precipitators (ESPs) are highly sensitive to dust characteristics, dust sizes and dust loadings and must be designed specially for such duty. Such equipment is often designed with conditioning systems (e.g. SO3 injection for dusts with high resistivity for their capture in ESPs) to account for the characteristics of the particulates, and therefore is not flexible to changing operating conditions. In contrast, this invention will allow capture of dusts by the aforesaid liquid films irrespective of dust characteristics, sizes, loadings and temperatures.

FIGS. 12 and 13 show in cross-sectional views a typical embodiment of the invention for indoor air pollution control, wherein indoor air is drawn through a pipe 68 and comes into contact with re-circulated solution through the film modules 20 in an interaction zone 69. The liquid at the bottom of these modules 20 is recycled by means of a pump at 140 to a liquid outlet 142 located above the liquid in a tray 144. The air is prevented from going directly into a next interaction zone 69' by a baffle 70 and a corresponding liquid seal at the bottom thereof. Dusts and soluble components will be washed away in the interaction zone 69 to a large extent. The air then enters into the interaction zone 69' by passing through the film modules 20 therein from inside of the modules 20 to the outside. The air is contacted with NaOH solution 146 or with equivalent other solutions in this zone to remove some of the undesirable compounds. This solution is recycled by means of a further pump 148 and delivered to an upper outlet 150 above the tray. The air coming out of the modules from the interaction zone 69' enters into the modules in a next interaction zone 69" from outside to inside and is then further contacted with KMnO4 solution 152 in the interaction zone 69" to kill bacteria or virus etc. from the air. The air is prevented from entering into a next interaction zone 69'" directly from the interaction zone 69" by a baffle 70" and a corresponding liquid seal at the bottom thereof. The liquid seals help to carry the overflow from one zone or chamber to the other. The air leaving the interaction zone 69" enters into the interaction zone 69'" through the film modules in the interaction zone 69'". The air is now rinsed with fresh make-up water 154 in the interaction zone 69'" and clean air is let out through an outlet pipe 68'. This fresh water enters above the tray through an inlet 156.

It should be apparent that selective pollutants from indoor air can be eliminated by contacting the air with a liquid specifically suited for such removal. Treatment of the gas with multiple liquids is made possible through such simplified arrangements of fluid-liquid contacts as shown. Similarly, the number of stages for a particular removal of component can be increased, if necessary. The light weight of the equipment, low pressure drops in both liquid and gas phases, ease of monitoring and operation with the invention render indoor air pollution control a practical proposition.

The liquid film created by this the invention is free standing by means of the supporting guides—the film does not adhere to a wall as in wetted wall columns. Thus, one key feature of this invention is the exposure of both sides of the liquid film to the ambient media. A very large surface area can be created with a small amount of liquid. For example, in a 6 inch nominal diameter film module with three annular films at 3, 4 and 5 inch diameters and with an effective film length of eighteen inches and a film thickness of $1/32$ inch, the total exposed surface area with both sides of each film exposed is over 1350 square inches for a hold-up volume of less than 16 cubic inches per module. The slot between the film guides may be covered with a sponge, fiber or similar material to impede the flow of liquid between the guides.

The porosity of the abovementioned bundle, i.e. free flow area between strings, is over 66 percent for each annular ring for a film module with $1/32$ inch diameter string and kept at a pitch of $3/32$ inch. Thus, for a 4 ft diameter tower with 28 film modules per tower cross-section, total exposed surface of the films is over 260 sq. ft. (with both sides exposed) compared to a tower cross-section of 12.56 sq. ft. By reducing film thickness and/or increasing number of films per module, reducing the diameter of the strings and arranging more modules per cross-section of the tower, further substantial improvements can be made, if necessary. Large surface area and the arrangement of fluid-liquid contacting as embodied in this invention give rise to a very high and assured rate of heat and material transfer together with high efficiency of operation and substantial reduction in equipment size.

It should be noted that slits on the tray are not essential for generating liquid films. For example, liquid from an enclosed plate with an open edge which is covered with film guides or which is adjacent to the top ends of a line of guides will give rise to a liquid film as the liquid flows over the edge and between the film guides. Such arrangement will be particularly suitable for handling slurries and liquids with fine suspensions.

It will be apparent to those skilled in the art that in light of the foregoing disclosure, many alterations and modifications are possible in the practice of this invention without departing from the spirit or scope thereof. Accordingly, the scope of the invention is to be construed in accordance with the substance defined in the following claims.

What is claimed is:

1. A fluid-liquid contacting apparatus comprising:

a housing having a bottom and a tray mounted therein, said tray separating an upper section of the housing for holding liquid and an enclosed lower section for liquid-fluid interaction; and at least one line of substantially uniformly spaced, thin, straight film guides in close proximity extending downwardly from said tray towards said bottom, thereby defining a grille for establishing a flowing liquid film across a substantial section of said lower section, the liquid flowing in panes between adjacent film guides during use of the apparatus;

a fluid inlet at one side of said lower section of the housing and fluid outlet at an opposite side of said lower section; and means for causing a fluid to flow across said lower section from said fluid inlet through said grille and said panes of flowing liquid, and to said fluid outlet;

wherein a narrow slit is formed in said tray along said at least one line of film guides for enabling liquid in the upper section to flow to the lower section and form said panes, whereby said fluid flowing through the lower section can efficiently interact with said liquid film during use of said apparatus by flowing through said liquid film.

2. A gas-liquid contacting apparatus comprising:

a housing compartmentalized by a tray mounted therein into an upper zone for holding a liquid and an enclosed lower zone for liquid-gas interaction;

said tray having at least one narrow slit therein for enabling liquid contained in the upper zone to flow to the lower zone; and at least one line of substantially uniformly spaced, elongate, thin film guides mounted in close proximity in the housing and extending from said at least one slit in the tray and substantially into and across the interaction zone, thereby defining a grille for establishing a flowing film of liquid over a substantial area in the interaction zone, said film guides being arranged in sufficient proximity to one another that said liquid is able to flow in panes between adjacent guides;

at least one gas inlet or in said housing on one side of said grille;

at least one gas outlet port in said housing on an opposite side of said grille; and motive means for causing said gas to flow through said grill and through said panes of flowing liquid, whereby said gas can interact with the liquid of said film.

3. The apparatus according to claim 2 wherein said film guides are formed from one or more strings or wires.

4. The apparatus according to claim 3 wherein said film guides are connected to a bottom of said housing and connected to said tray.

5. A gas-liquid contacting apparatus comprising:

a housing compartmentalized by a tray mounted therein into an upper zone for holding a liquid and a lower zone or liquid-gas interaction;

said tray having at least one narrow slit therein for enabling liquid contained in the upper zone to flow to the lower zone; and at least one line of substantially uniformly spaced, elongate, thin film guides mounted in close proximity in the housing and extending from said at least one slit in the tray and substantially into the interaction zone, thereby defining a grille for establishing a flowing film of liquid over a substantial area of the interaction zone, said film guides being arranged in sufficient proximity to one another that said liquid is able to flow in panes between adjacent guides, a vertically extending tubular member mounted centrally within said at least one line of film guides and extending through said tray, said at least one line forming a closed loop, whereby a gas present in said interaction zone can interact with the liquid of said film.

6. The apparatus according to claim 5 including motive means for causing said gas to flow through said interaction zone.

7. The apparatus according to claim 6 including means for re-circulating liquid accumulating in said interaction zone to said upper zone.

8. The apparatus according to claim 5 wherein said tubular member is hollow and elongate, has slots in the body thereof for flow of gas into or out of said tubular member, and has a height above said tray sufficient to clear the depth of liquid in said upper zone;

a plate is mounted to a bottom end of the tubular member to which bottom ends of said film guides are secured; and an annular sleeve is slidably mounted on an upper portion of the tubular member and has at least one outwardly extending flange for adjusting the tension of said film guides which pass through said at least one slit in said tray and are secured to the flange.

9. The apparatus according to claim 8 wherein said at least one slit in said tray is a closed loop.

10. The apparatus according to claim 8 wherein there are a plurality of closed loops of film guides arranged concentrically, and said tray is divided into annular disks by concentric closed loop slits, said apparatus including means for connecting said annular disks.

11. The apparatus according to claim 10 including at least one screen surrounding said film guides for the protection thereof.

12. A liquid-fluid contacting apparatus comprising:

a vessel having at least one liquid inlet in a top portion thereof and at least one liquid outlet in a bottom portion thereof, said vessel also having at least one gas inlet and at least one outlet for a gas or vapour;

a series of trays each mounted horizontally and adapted to hold a body of liquid thereon;

at least one module mounted on each tray with each module comprising at least one line of substantially uniformly spaced, elongate, thin film guides mounted in close proximity and extending from at least one slit formed in the plane of the respective tray by the module and substantially into a liquid-fluid interaction zone below the respective tray, said film guides defining a grille for establishing a flowing film of liquid over an area in the interaction zone, said at least one module and said film guides being constructed and arranged so as to cause said gas or vapour passing through said interaction zone from said at least one gas inlet to said at least one gas outlet to flow through said grille and through said flowing film of liquid;

wherein in use of the apparatus, liquid entering through said at least one liquid inlet flows from each tray downwards to said bottom portion of the vessel by passing through one or more modules and gas or vapour passing through said interaction zone interacts with the liquid films formed by said modules.

13. A liquid-fluid contacting apparatus according to claim 12 wherein said apparatus is a column, said vessel is an upright, vertically extending vessel, and said trays are mounted one above the other in said vessel, and wherein in use of the column, the liquid flows downwards from the top tray to the bottom tray by passing through the slits formed by said modules.

14. A process for contacting a liquid with a gas or vapour for interaction therebetween, said process comprising:

providing a housing with a tray mounted therein, said tray separating said housing into an upper section and a lower section for liquid-gas or liquid vapour interaction;

delivering said liquid to said upper section;

delivering said as or vapour through a gas inlet into said lower section;

permitting said liquid to flow from the tray in the form of a liquid film down a line of thin, straight film guides positioned in close proximity to but spaced apart from one another, said film guides extending downwardly from said tray and into said lower section, said liquid covering the film guides and flowing in panes extending between adjacent film guides; and passing said gas or vapour through said film guides and through said liquid film for a desired interaction between said liquid and said gas or vapour.

15. A process according to claim 14 wherein the liquid flows to a bottom of said housing, said process including reusing the liquid at the bottom of said housing by delivering the used liquid at the bottom of said housing to said upper section.

16. A process according to claim 14 wherein there are a number of narrow slits formed in said tray and said liquid is permitted to flow from said slits in the form of a number of separate liquid films down lines of thin, straight film guides.

17. A process according to claim 14 wherein said upper section is adapted to hold said liquid at least temporarily and said tray is formed with at least one narrow slit through which said liquid flows in the form of said liquid film, and wherein said film guides extend downwardly from the location of said slit.

* * * * *

UNITED STATES PATENT AND TRADEMARK OFFICE
CERTIFICATE OF CORRECTION

PATENT NO. : 5,535,989
DATED : July 16, 1996
INVENTOR(S) : Sen

It is certified that error appears in the above-indentified patent and that said Letters Patent is hereby corrected as shown below:

Column 6, line 16, delete "19 to in" and insert --19 in--;

Column 10, line 66, delete "and fluid" and insert --and a fluid--;

Column 11, line 26, delete "inlet or" and insert --inlet port--;

Column 11, lines 41 and 42, delete "zone or" and insert --zone for--.

Signed and Sealed this

Fifteenth Day of October, 1996

Attest:

BRUCE LEHMAN

*Attesting Officer*   *Commissioner of Patents and Trademarks*